United States Patent [19]
Wilmers

[11] 3,934,558
[45] Jan. 27, 1976

[54] THROTTLING MEANS FOR TROCHOIDAL ROTARY COMBUSTION ENGINES

[75] Inventor: Gottlieb Wilmers, Neuenstadt, Germany

[73] Assignees: Audi NSU Auto Union Aktiengesellschaft, Neckarsulm; Wankel G.m.b.H., Lindau, Bodensee, both of Germany

[22] Filed: Apr. 2, 1975

[21] Appl. No.: 564,364

[30] Foreign Application Priority Data
Apr. 19, 1974 Germany............................ 2418852

[52] U.S. Cl................................. 123/8.45; 123/108
[51] Int. Cl.² ......................................... F02B 53/06
[58] Field of Search.................. 123/8.01, 8.45, 108; 418/61 A

[56] References Cited
UNITED STATES PATENTS

| | | |
|---|---|---|
| 3,347,213 | 10/1967 | Froede............................... 123/8.45 |
| 3,762,376 | 10/1973 | Eberle et al. .................. 123/8.45 X |
| 3,886,911 | 6/1975 | Glatt................................. 123/8.45 |

Primary Examiner—Carlton R. Croyle
Assistant Examiner—Michael Koczo, Jr.
Attorney, Agent, or Firm—Raymond P. Wallace; Victor D. Behn

[57] ABSTRACT

A rotary internal combustion engine of trochoidal type, having a fuel-air intake port in a side wall thereof, with a rotary valve disposed immediately adjacent to the port and serving as a throttling means as well as controlling the timing of port closing.

6 Claims, 4 Drawing Figures

THROTTLING MEANS FOR TROCHOIDAL ROTARY COMBUSTION ENGINES

BACKGROUND

This invention relates to rotary internal combustion engines of the trochoidal type, and more particularly to throttling means for such engines, as well as means for controlling the intake port timing.

Engines of this type have a peripheral shell having a multilobed trochoidal inner surface and a pair of side walls defining an engine cavity, with a rotor of generally polygonal profile mounted for rotation on an eccentric portion of a shaft within the cavity, the rotor also performing a planetary motion therein. The apex portions of the rotor continuously sweep the inner trochoidal surface of the shell in sealing relation, forming with the cavity walls a plurality of chambers of variable volume in which the phases of induction, compression, expansion, and exhaust take place.

Intake and exhaust ports may be disposed either in the peripheral shell and controlled by the rotor apexes, or in one or both side walls and controlled by the side faces of the rotor sliding over the ports, or in some combination of the two systems. When a side intake port is provided in at least one side wall and controlled by the rotor side face, comparatively good idling and partial-load performance can be obtained, but there is the difficulty that the throttling device is normally disposed in the induction channel at a considerable distance from the port opening in the engine chamber. Therefore, there exists some unmixing of the fuel-air mixture and condensation of small droplets of fuel on the walls of the induction channel. Even if a throttle flap were disposed relatively close to the port, its axis must be positioned at a distance of at least half the diameter of the flap from the port in order that the flap should not protrude into the engine cavity. Even this arrangement leaves some length of channel, and particularly for idling and partial-load operation the mixture arriving at the port may not be adequately prepared. Further, such an expedient would necessarily require that the port be circular rather than elongated in the direction of rotor motion, as is preferable.

The foregoing defects and disadvantages are corrected by the throttling device of the present invention.

SUMMARY

The fundamental concept of this invention is to provide a rotary internal combustion engine having a side intake port with a throttling device of such design and disposed in such proximity to the induction port that preparation of a good mixture is obtained at the port opening, and that there is provided favorable port timing for each load range.

The problem is solved by providing a rotary valve disposed with its axis of rotation perpendicular to the longitudinal axis of the housing and also approximately perpendicular to the lengthwise elongation of the intake port in the direction of rotor motion, the valve being positioned in close juxtaposition to the port opening, and of such configuration that on pivoting the valve on its own axis it progressively increases the effective cross-section of the induction channel and progressively alters the timing at the port in the direction of later closing.

By the use of the rotary valve of this invention, which fulfills the function of the usual throttling device, the space between the throttling device and the intake port can be decreased to such an extent during operation of the engine the fuel-air mixture flowing through the induction channel, after passing the throttling gap formed by the rotary valve, is prepared right at the induction port and at its entry into the operating chamber. Thus there are no detrimental deposits of fuel particles on the walls of the induction channel.

A further advantage is that since the rotary valve opens directly at the port, it functions, in effect, to vary the area of the port opening and the position of the open area in correspondence to the engine load. With the valve in a nearly closed position, corresponding approximately to a setting for idling or low partial load range, the open cross-section of the induction port is not only small but is disposed relatively upstream with regard to rotor direction, resulting in earlier closing and diminished volumetric efficiency of the operating chamber, that is, relatively smaller delivery of fuel-air mixture thereto. As the valve is opened more widely it increases the port cross-section in the downstream direction, resulting in higher volumetric efficiency or greater fuel delivery, and also in later closing of the port.

It is therefore an object of this invention to provide a rotary throttling valve for a side-ported internal combustion engine of trochoidal type.

It is another object to provide such a throttling valve immediately adjacent to the intake port to vary the cross-section of the port opening.

A further object is to provide a rotary internal combustion engine with a throttling valve which prepares the fuel mixture at the intake port opening.

Other objects and advantages will become apparent on reading the following specification in connection with the accompanying drawings.

DESCRIPTION OF THE PREFERRED EMBODIMENTS

The invention will be described in terms of an engine having a trochoidal peripheral shell having a plurality of lobes, and a single rotor disposed between a pair of side walls, with an intake port in one side wall. However, it is to be understood that the invention may also be used in an engine having an intake port in each side wall, and that it is also equally applicable to engines having two or more rotors, with side walls disposed between rotors.

Figure 1:
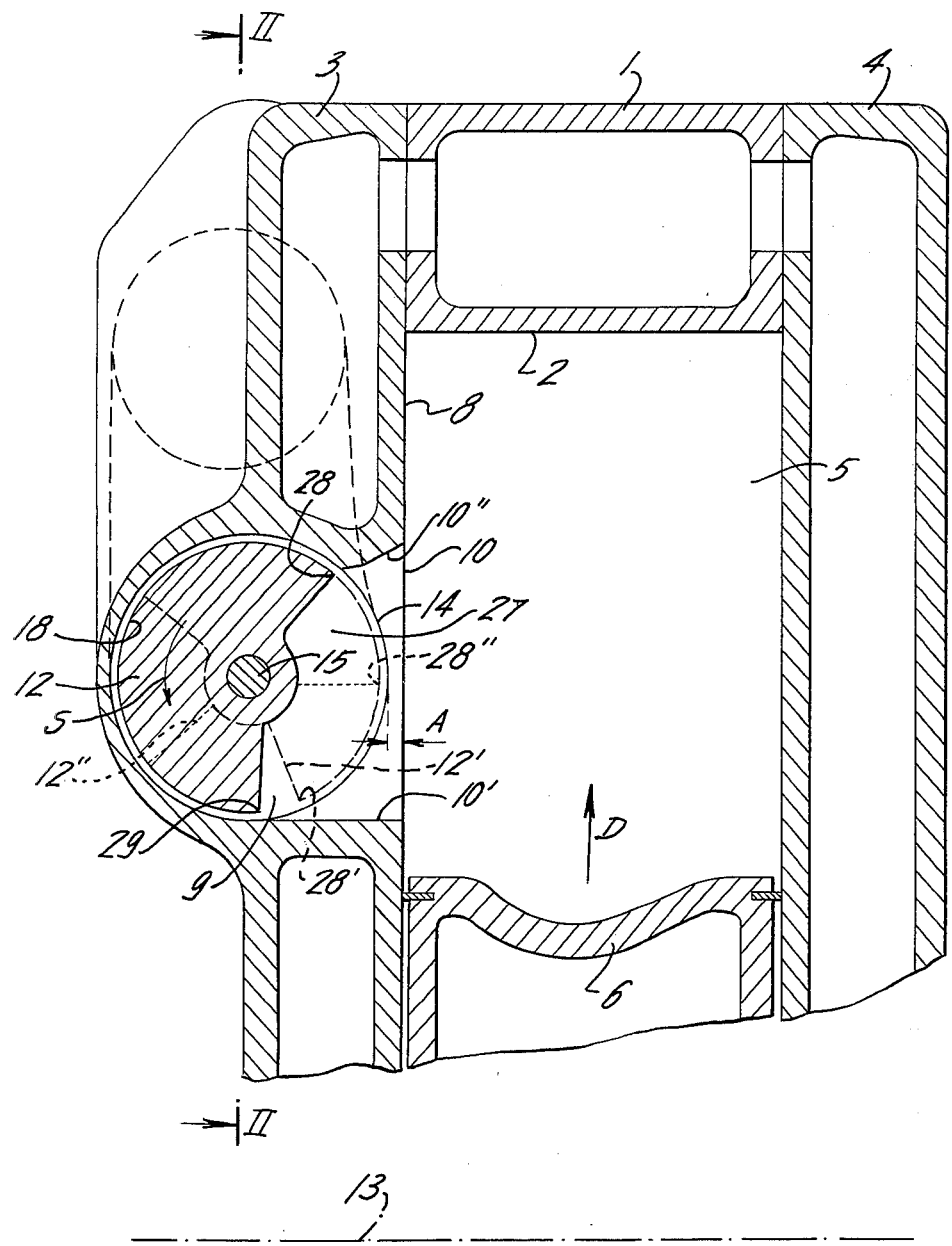
FIG. 1 is a fragmentary longitudinal cross-section through a trochoidal rotary engine, taken along line I—I of FIG. 2.

In FIG. 1 there is shown a rotary internal combustion engine having a housing comprising a peripheral shell 1 with a multilobed inner peripheral surface 2, and two side walls 3 and 4, the housing defining an internal engine cavity 5. A rotor 6 of generally polygonal profile is rotatably mounted within the engine cavity, with its apex portions 7 continuously sweeping the inner peripheral surface 2 in sealing relationship therewith as the rotor turns in the direction shown by the arrow D. One side wall 3 has disposed therein an induction channel 9 communicating with an intake port 10 disposed in the inner surface 8 of the side wall, which port is controlled by the side face of the rotor 6. In the induction channel 9 there is disposed a throttling device comprising a rotary valve 12 which is rotatable about its axis 11. The valve 12 is disposed immediately adjacent to the port 10, and fulfills the function of the usual throttle flap for metering the fuel-air mixture.

Figure 2:
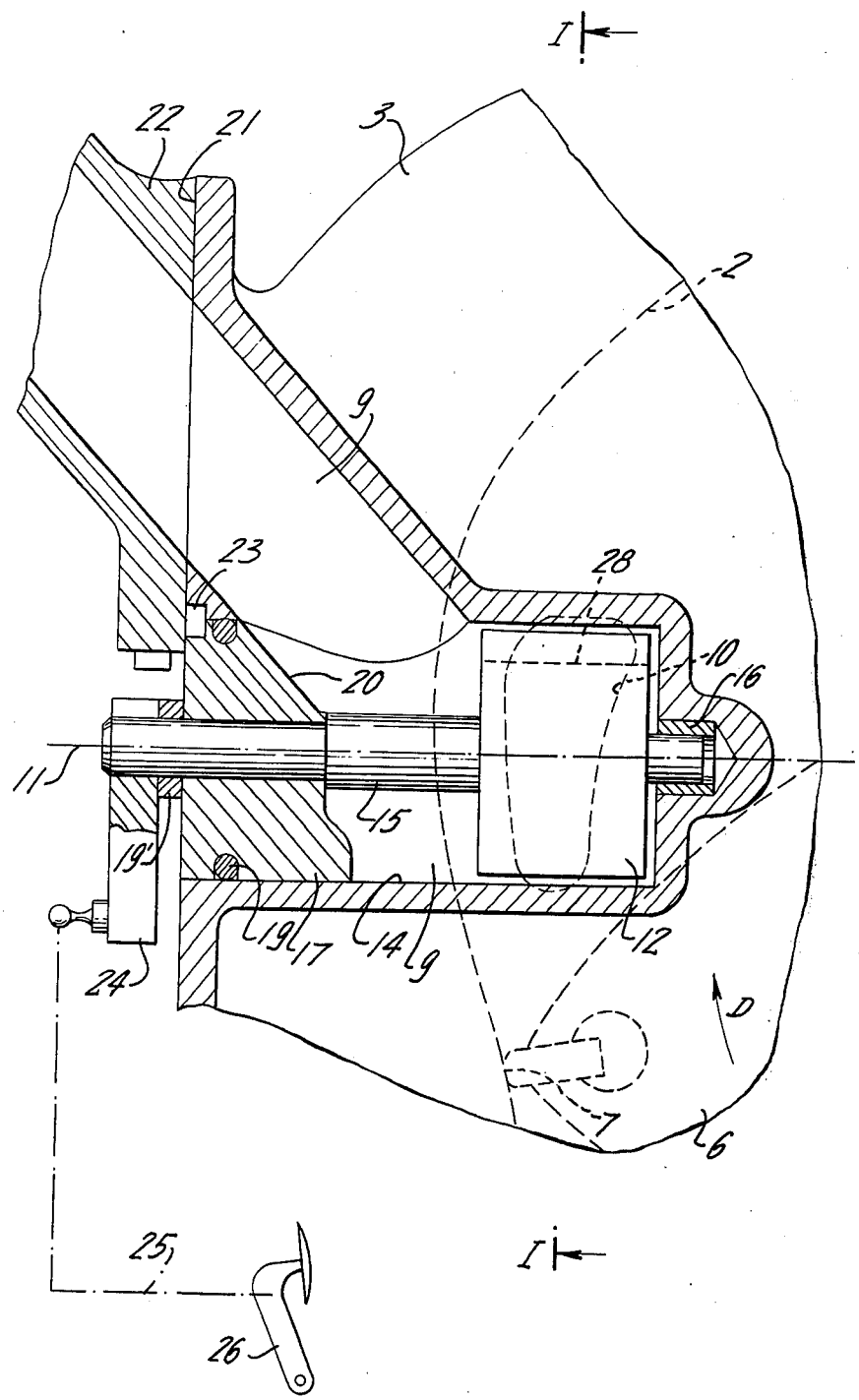
FIG. 2 is a fragmentary cross-section transverse to the engine axis along line II—II of FIG. 1, and showing the rotary throttling valve in relation to the intake port.

As will be seen in FIG. 2, the intake port 10 is elongated in the direction of rotor rotation. The rotary valve is disposed with its axis 11 approximately transverse to the long dimension of the port, and also perpendicular to the housing axis 13 (FIG. 1), the valve 12 being positioned within a bore 14 which forms a portion of the induction channel 9. The shaft 15 which turns the valve has its inner end seated in a bearing 16 supported in the side wall 3, its outer end being journaled in a guidepiece 17 disposed in the outward end of bore 14. The guidepiece 17 closes the cylindrical bore 14 and seals it from leakage by an O-ring 19. The valve member 12 has a cylindrical surface 18 which closely fits the wall of bore 14. Guidepiece 17 also has a portion 20 forming part of the wall of induction channel 9 leading inward to the chamber directly above the valve.

The induction channel 9 is fed by a tube or manifold 22 leading from a carburetor or fuel-injection device, the manifold abutting the outer surface 21 of the side wall. The manifold may also cover a stud or pin 23 which prevents the guidepiece 17 from turning, the manifold restraining the guidepiece from withdrawal from the bore 14. The outer end of shaft 15 protrudes through the guidepiece and is surrounded by a seal 19', with a lever member 24 attached to the outer end of the shaft. Lever 24 is connected to a schematically shown linkage 25 having an actuating lever or accelerator pedal 26.

The valve member 12 is of generally cylindrical form, but has an arcuate portion of the cylinder cut away to form an arcuate cavity 27 between the body of the valve 12 and the wall of the bore 14. When the valve is rotated in the direction shown by the arrow S (FIG.1), the portion of the valve defining one circumferential end of cavity 27 forms a leading edge 28, and the portion defining the other circumferential end of the cavity forms a lagging edge 29, both such edges being parallel to the valve axis 11 and transverse to the long dimension of port 10. The valve member 12 is disposed so that its circumferential surface 18 is very close to the inner surface 8 of side wall 3 at the induction port. This is shown by the spacing A in FIG. 1, much exaggerated in the drawing, the cylindrical surface of valve 12 being very nearly tangent to the inner wall surface 8, distance A being only such as is necessary for manufacturing reasons of tolerance and the like.

During operation of the engine when idling or under light load the rotary valve 12 assumes approximately the position 12' shown in dashed line in FIG. 1, and the edge 28 changes position to that shown as 28'. Fuel-air mixture passing through the induction channel 9 and the chamber above the valve passes through the throttling gap formed between edge 28' and the upstream edge 10' of the intake port, which is the opening edge of the port as the rotor 6 travels in the direction of arrow D, whereupon the mixture enters the expanding operating chamber 5. The position 12' of the valve sets the timing of gas entry relatively early. The open cross-section diminishes as the trailing edge of the rotor crosses the upstream edge 10' of the port and approaches the tangency point of the valve body; the port is closed and gas entry ends, at the latest, when the tangency point is reached. The gap A, although shown relatively large for clarity of illustration, has a dimension of only a few thousandths of an inch and only an insignificant quantity of fresh gas can pass through it.

With increasing load the valve 12 is turned further in the direction of arrow S, which displaces its opening edge downstream in the rotor direction D, thus increasing both the throttling gap and the effective cross-section of the intake port. When the valve body takes the position 12" shown in dotted line, the intake port is approximately half open, between its upstream edge 10' and the valve edge 28", which is now about at the tangency point and approximately across the center of port opening 10. The closing time of the port has now been correspondingly delayed.

To reach full load and high speed operation, the valve 12 is turned still further in the direction arrow S to the position shown hatched in FIG. 1. The intake port is now open to its fullest extent, from upstream edge 10' to downstream edge 10", and will close only when the trailing portion of the rotor 6 crosses edge 10".

In any position of valve 12 the throttling gap is thus formed right at the port itself, by those portions of the valve and the port edges between which the mixture passes. This provides a particularly good preparation of the mixture directly at the port through which it enters the operating chamber 5, and obviates the undesirable deposit of fuel particles on the walls of the induction channel downstream of the throttling device in prior art systems. In addition, the present invention provides progressively later port closing time, that is, a longer open time, as load and/or speed increases, in contradistinction to the prior art wherein the port time was fixed and the fuel feed could be varied only by a throttling device remote from the port.

Figure 3:
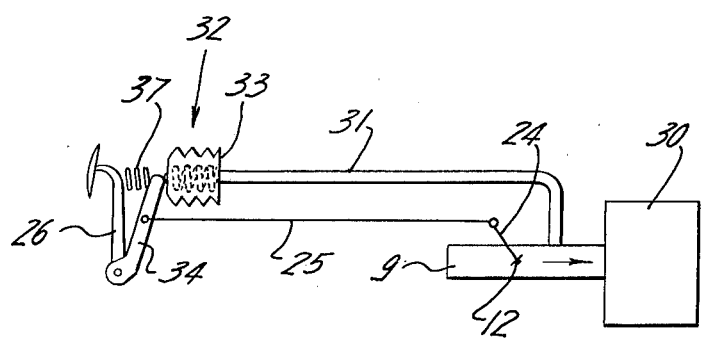
FIG. 3 is a schematic showing of an actuating system for the rotary valve.

In FIG. 3 there is shown schematically a throttle control system. The rotary valve 12 is shown installed in the induction channel 9 of a rotary engine 30, which valve may be operated by the lever 24 through a pushrod 25. An accelerator pedal 26 acts through a compression spring 37 upon an intermediate lever 34 which is connected to the pushrod 25. An overriding device 32 is provided, comprising an underpressure line 31 having an orifice in the induction channel 9 downstream from the valve 12, and its other end communicating with the interior of an expansible chamber 33, Such as a Sylphon bellows, diaphragm case, or the like. The bellows 33 is resiliently loaded, either by its own elastic construction or by an internal compression spring, in the direction of expansion.

The bellows 33 is positioned adjacent to the intermediate lever 34 and cooperating therewith to limit the amount of travel of the lever. During operation of the engine 30 and when suction exists in the induction chanel, the internal suction on the bellows 33 shortens it by an amount corresponding to the degree of underpressure in line 31, and clearance for the travel of lever 34 is increased so that preponderantly direct operation of the valve 12 by pedal 26 is possible. When the underpressure diminishes, as by falling engine speed but with the valve 12 fully open, the bellows re-expands with a decrease of the clearance for intermediate lever 34, so that the lever is eventually pushed back by the bellows far enough that the valve is moved into the closed position through pushrod 25 which is linked to lever 34. If the pedal 26 is still held fast, the spring 37 between the pedal and lever 34 will be compressed, so that regardless of the failure to release the pedal the position of valve 12 will still move toward the closed position. Thereby the supply of fuel mixture to the engine is throttled and the control time of the intake port reverts to early closing, so that an optimum chamber intake occurs for this operating condition.

Figure 4:
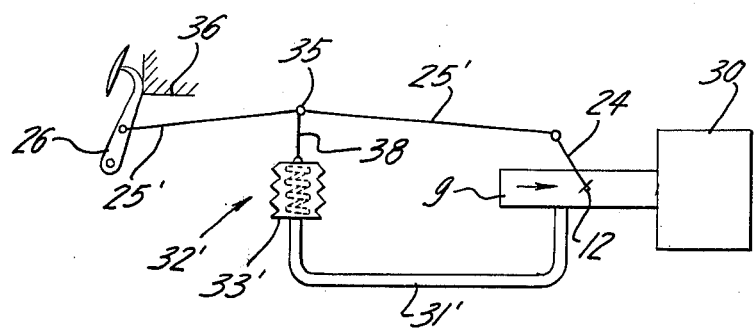
FIG. 4 is a schematic showing of another system for actuating the rotary valve.

In the arrangement of the overriding device 32' shown in FIG. 4 the same numerals as in FIG. 3 are used for similar parts. In the arrangement of FIG. 4 the underpressure line 31' has an orifice disposed in the induction channel 9 upstream of the rotary valve 12. The pushrod 25' is divided by a pivot joint 35, which also engages one end of a rod 38 rigidly connected to the bellows 33'. As in FIG. 3, the bellows 33' is also resiliently loaded in the direction of expansion, so that the two parts of pushrod 25' run angularly from the rod 38 and are thus somewhat shorter in total length than when extended in a straight line.

During operation of the engine 30 and with the accelerator pedal 26 fully against the fixed stop member 36, the valve 12 is not fully open and the fuel mixture is throttled to some extent, resulting in a relatively early closing time of the induction port 10. If suction in the induction channel now rises, as at increased engine speed or increased load, the bellows 33' is contracted and pulls upon the joint 35, thereby reducing the angle of pushrod 25' to a straighter line, and consequently the valve 12 is turned to a larger opening. Complete opening of valve 12 and late closing of the intake port are thus possible only when at high engine speed a correspondingly higher suction is produced to act on the overriding device 32'.

The advantage of the overriding devices 32 and 32' consists in that through indirectly influencing the position of the rotary valve 12, and depending on the load and engine speed, there is always a corresponding throttle adjustment to optimum mixture intake or volumetric efficiency.

What is claimed is:

1. A rotary internal combustion engine of trochoidal type, having a housing comprising at least one peripheral shell having a multilobed inner peripheral surface and at least two parallel side walls with the shell disposed between the side walls, the housing defining an engine cavity having a longitudinal axis, a rotor rotatably disposed within the cavity and having a generally polygonal profile with a plurality of apex portions which sweep the inner peripheral surface in sealing relation thereto, at least one side wall having in its inner surface an intake port for supplying fresh gas, the port having a greater lengthwise dimension in the direction of rotor rotation than in the radial direction and being opened and closed by a side face of the rotor, wherein the improvement comprises:

a. the side wall having an induction channel therein communicating with the intake port;
   b. a rotary valve disposed in the induction channel adjacent to the intake port, the axis of rotation of the valve being disposed perpendicularly to the housing axis and also approximately perpendicularly to the lengthwise dimension of the intake port;
   c. the valve cooperating with the upstream edge of the port to form a throttling gap and progressively increasing the cross-section of the open area of the port as the valve turns in the opening direction, and progressively delaying the closing time of the port with increasing valve opening.

2. The combination recited in claim 1, wherein the rotary valve has a cylindrical valve body having an arcuate recess therein communicating with the induction channel, the arcuate recess being defined at each end by a surface extending generally radially to the axis of rotation of the valve, each of said surfaces having an edge at the perimeter of the valve body and approximately parallel to the valve axis, one of said edges being the leading edge and the other surface being the lagging edge in the direction of valve opening, the leading edge forming a throttling gap with the upstream edge of the intake port and progressively delaying the closing time of the port with increasing valve opening.

3. The combination recited in claim 2, wherein the side wall has a cylindrical bore therein in which the rotary valve is disposed, the bore having its radially outer end closed by a guidepiece which positions the valve member, the guidepiece having an inner surface forming a portion of the induction channel.

4. The combination recited in claim 3, wherein there is provided an accelerator pedal and a linkage system operated by the pedal and operating the rotary valve, and an overriding device disposed in the linkage system and producing a closing moment on the valve with decreasing engine speed, independently of the positioning of the accelerator pedal.

5. The combination recited in claim 4, wherein the overriding device includes a resilient bellows member, an underpressure tube having one end communicating with the interior of the bellows and the other end communicating with the induction channel, lowered pressure in the induction channel causing a corresponding shortening of the effective length of the bellows member and allowing further opening ow thv valve.

6. Thv combination recited in claim 5, wherein the linkage syste4 between thv accelerator pedal and the valve includes a pushrod having one end attached to the valve, the pushrod being i5 two parts joined by a pivot joint with thv two parts angularly disposed to each other, one end ow thv bellows member being attached to the rod at the pivot joint so that shortening of the bellows in response to lower pressure in the induction channel increases the angle between the two rod parts in the direction of straightening the rod, thereby increasing the effective length of the pushrod and further opening the valve.

* * * * *